US009835861B2

(12) United States Patent
Bouaziz

(10) Patent No.: US 9,835,861 B2
(45) Date of Patent: Dec. 5, 2017

(54) SYSTEM HAVING AN ADJUSTMENT DEVICE AND METHOD FOR AUTOMATICALLY ADJUSTING/SWITCHING THE ADJUSTMENT DEVICE FOR A HEAD-UP DISPLAY DEVICE

(71) Applicant: AUDI AG, Ingolstadt (DE)

(72) Inventor: Tahar Bouaziz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/120,024

(22) PCT Filed: Feb. 20, 2015

(86) PCT No.: PCT/EP2015/000384
§ 371 (c)(1),
(2) Date: Aug. 18, 2016

(87) PCT Pub. No.: WO2015/124308
PCT Pub. Date: Aug. 27, 2015

(65) Prior Publication Data
US 2017/0068093 A1 Mar. 9, 2017

(30) Foreign Application Priority Data
Feb. 22, 2014 (DE) .................. 10 2014 002 493

(51) Int. Cl.
*G02B 27/01* (2006.01)
*B60K 35/00* (2006.01)
(Continued)

(52) U.S. Cl.
CPC .......... *G02B 27/0149* (2013.01); *B60K 35/00* (2013.01); *B60K 37/06* (2013.01);
(Continued)

(58) Field of Classification Search
CPC .............. G02B 27/0093; G02B 27/01; G02B 27/0101; G02B 27/0149; G02B 27/14;
(Continued)

(56) References Cited

U.S. PATENT DOCUMENTS 4,961,625 A * 10/1990 Wood .................. G02B 27/01
359/630
5,214,413 A * 5/1993 Okabayashi ......... G02B 26/127
345/7
(Continued)

FOREIGN PATENT DOCUMENTS

CN 103358997 A 10/2013
DE 101 21 392 A1 11/2002
(Continued)

OTHER PUBLICATIONS

German OA for Application No. 102014002493.8 dated Aug. 4, 2015.
(Continued)

Primary Examiner — Loha Ben
(74) Attorney, Agent, or Firm — Staas & Halsey LLP

(57) ABSTRACT

A head-up display device projects a display onto a projection area of a vehicle. An adjusting apparatus is coupled to the head-up display device and an operator control device to adjust at least one of the horizontal and vertical positions of the viewing window of the head-up display device in response to an operator control action. A sensing device senses and evaluates a line of vision of a user of the head-up display device. A system control device, coupled to the adjusting apparatus and the sensing device, engages and/or toggles the adjusting apparatus to adjust the horizontal and/or vertical viewing window of the head-up display device of the vehicle, provided that, and so long as, the sensing device recognizes that the user looks in the direction of the projection area.

6 Claims, 1 Drawing Sheet

(51) Int. Cl.
  *G06F 3/01*    (2006.01)
  *B60K 37/06*   (2006.01)
  *G02B 27/00*   (2006.01)
  *B60R 1/072*   (2006.01)
  *G02B 5/08*    (2006.01)
  *B60R 1/04*    (2006.01)
  *B60R 1/06*    (2006.01)

(52) U.S. Cl.
  CPC .......... *B60R 1/072* (2013.01); *G02B 27/0093* (2013.01); *G02B 27/01* (2013.01); *G06F 3/013* (2013.01); *B60K 2350/1048* (2013.01); *B60K 2350/2013* (2013.01); *B60K 2350/2052* (2013.01); *B60K 2350/352* (2013.01); *B60K 2350/405* (2013.01); *B60K 2350/901* (2013.01); *B60R 1/04* (2013.01); *B60R 1/06* (2013.01); *G02B 5/08* (2013.01); *G02B 2027/0163* (2013.01); *G02B 2027/0181* (2013.01); *G02B 2027/0187* (2013.01)

(58) Field of Classification Search
  CPC ...... G02B 2027/012; G02B 2027/0156; G02B 2027/0159; G02B 2027/0163; G02B 2027/0179; G02B 2027/0181; G02B 2027/0187; G02B 5/08; G02B 7/00; G02B 7/18; G06F 3/013; G09G 5/00; B60K 35/00; B60K 37/06; B60K 2350/1048; B60K 2350/2013; B60K 2350/2052; B60K 2350/352; B60K 2350/405; B60K 2350/901; B60R 1/00; B60R 1/04; B60R 1/06; B60R 1/072; B60R 1/12; B60R 2001/1215; B60R 2001/1253
  USPC .................. 359/630, 632, 634; 348/148, 149, 348/E5.135, 744; 340/425.5, 435, 438, 340/461
  See application file for complete search history.

(56) References Cited

U.S. PATENT DOCUMENTS

| | | | |
|---|---|---|---|
| 5,760,931 A * | 6/1998 | Saburi ................ | G02B 27/0101 345/7 |
| 6,397,137 B1 | 5/2002 | Alpert et al. | |
| 6,580,562 B2 * | 6/2003 | Aoki ................... | G02B 27/0101 345/7 |
| 7,401,920 B1 * | 7/2008 | Kranz .................... | A61B 3/113 351/209 |
| 7,561,181 B2 * | 7/2009 | Schofield ................ | B60R 1/00 348/113 |
| 8,842,176 B2 * | 9/2014 | Schofield ................ | B60R 1/00 348/113 |

FOREIGN PATENT DOCUMENTS

| | | |
|---|---|---|
| DE | 102005009397 A1 | 9/2006 |
| DE | 102007015877 A1 | 10/2008 |
| DE | 102007035505 A1 | 1/2009 |
| DE | 102007061537 A1 | 7/2009 |
| DE | 102008023225 A1 | 11/2009 |
| DE | 10 2012 006 966 A1 | 11/2012 |
| DE | 102012006966 A1 | 11/2012 |
| DE | 102012014909 A1 | 1/2014 |
| DE | 102014002493.8 | 2/2014 |
| EP | 1 123 842 A2 | 8/2001 |
| EP | 1 562 102 A2 | 8/2005 |
| EP | 1 123 842 B1 | 12/2005 |
| WO | PCT/EP2015/000384 | 2/2015 |

OTHER PUBLICATIONS

German OA for Application No. 102014002493.8 dated Jul. 1, 2016.
International Search Report for PCT/EP2015/000384 dated May 28, 2015.
WIPO translation of International Preliminary Examination Report on Patentability for PCT/EP2015/000384 dated Sep. 15, 2016.
Chinese Office Action for Chinese Application No. 201580009411 dated Apr. 13, 2017.

* cited by examiner

SYSTEM HAVING AN ADJUSTMENT DEVICE AND METHOD FOR AUTOMATICALLY ADJUSTING/SWITCHING THE ADJUSTMENT DEVICE FOR A HEAD-UP DISPLAY DEVICE

CROSS REFERENCE TO RELATED APPLICATIONS

This application is the U.S. national stage of International Application No. PCT/EP2015/000384, filed Feb. 20, 2015 and claims the benefit thereof. The International Application claims the benefits of German Application No. 102014002493.8 filed on Feb. 22, 2014, both applications are incorporated by reference herein in their entirety.

BACKGROUND

Described below are a system having and a method for automatically engaging/toggling an adjusting apparatus for a head-up display device.

The head-up displays known from the related art are one of the numerous options that can be used to display to a driver of a (motor) vehicle, for example, information that is relevant to him, for example in the form of text, graphics, virtual images, etc.

Particularly owing to the comparatively small installation space available for the head-up display in (motor) vehicles, the viewing window, which is also called the "eye box" or "head box", within which the information displayed by the head-up display is visible to a user is relatively small. Since the eye or head positions of possible users (drivers or operators) can differ from one another significantly, for example owing to different body size, adjustments of the seat in the horizontal direction, height of the seat area and gradient of the back rest, it may be that a firmly prescribed viewing window ("eye box" or "head box") does not allow a user to see the information provided by the head-up display, since his eye position is outside this viewing window.

Against this background, solutions have been developed that can be used to adapt the horizontal and/or vertical position of a display by a head-up display device on a projection area, and hence also the position of the viewing window in a vehicle.

As such, by way of example, DE 10 2005 009 397 A1 describes a motor vehicle having a head-up display, wherein the operator control unit for operator control of the head-up display is arranged in the arm rest of the driver's door of the motor vehicle. The operator control unit can have an operator control element for vertically and horizontally adjusting the viewing window of the head-up display, the operator control unit being able to be in the form of a rotary switch.

DE 10 2007 015 877 A1 relates to a depiction device for a virtual image in a vehicle, wherein a positioning of the virtual image is adjustable, having an interface to a sensor unit for sensing a physical adjustment of at least one vehicle part and, by a computation unit, for positioning the virtual image on the basis of the physical adjustment of the at least one vehicle part. A physical adjustment that can be taken into account for a vehicle part is an adjustment of a driver's seat, of a mirror of the vehicle and/or a height adjustment of at least one steering wheel, for example. From the adjustment of the at least one vehicle part, it is possible to ascertain a head position, and the virtual image can be depicted on the basis of the stored head position.

DE 10 2007 035 505 A1 discloses a motor vehicle having a head-up display for displaying information, wherein the information displayed by the head-up display is visible from a room element within the motor vehicle. The motor vehicle further has an adjusting device for adjusting the position of the room element, a sensing device for sensing the position of the eyes or of the head of a driver of the motor vehicle and a control device, wherein the control device is set up, and coupled to the adjusting device and the sensing device, such that the position of the room element is adjusted on the basis of the sensed position of the eyes or of the head of a driver.

Furthermore, DE 10 2008 023 225 A1 describes a head-up display having an image producing device for producing an image and having an optical system for depicting the image, particularly onto a windshield of a vehicle, having an adjusting device for adjusting the depiction device such that the height of the depiction of the image is changed, and having a control device that is set up such that it prompts automatic rotation of the image producing device on the basis of the adjustment of the depiction device. This is intended to compensate for tolerances when the head-up display is installed, tolerances when the windshield is installed and/or for the curvatures of the windshield, which cause lettering for presentation to "hang down" when the image produced is adjusted for height.

SUMMARY

The systems known from the related art for adjusting the display of head-up displays in (motor) vehicles have been developed by the inventors in a novel and advantageous manner.

Specifically, a system for automatically engaging/toggling an adjusting apparatus for adjusting a horizontal and/or vertical position of a viewing window of a head-up display device of a vehicle is proposed, including:

a head-up display device, which is set up to be able to project a display onto a projection area of a vehicle; and an adjusting apparatus, coupled to the head-up display device, having an operator control device that is set up to be able to adjust at least the horizontal and/or vertical position of the viewing window of the head-up display device by a control action of an operator on the operator control device.

The system further:

has a sensing device for sensing and evaluating a line of vision of the user or operator of the head-up display device, and has a control device that is coupled to the adjusting apparatus and the sensing device, wherein the control device is set up to engage/toggle the adjusting apparatus to adjust the horizontal and/or vertical viewing window of the head-up display device of the vehicle, provided that, and so long as, the sensing device recognizes that the user or operator looks in the direction of the projection area.

The system affords the advantage that the user or operator of the head-up display device for adjusting the horizontal and/or vertical viewing window of the head-up display device does not first need to mechanically activate or toggle an adjusting apparatus, but rather such adjustment can readily be performed by the control action of the operator on the operator control device, provided that, and as long as, the user or operator looks in the direction of the projection area.

According to a first advantageous development of the system, the adjusting apparatus having the operator control device is further able to adjust at least one exterior mirror and/or an interior mirror of the vehicle. This development allows the number of operator control elements for different vehicle-based devices to be advantageously reduced.

According to another, second advantageous development of the system, the control device is further set up:

to engage/toggle the adjusting apparatus to adjust an exterior mirror by an operator control action by the user or operator on the operator control device, provided that, and so long as, the sensing device recognizes that the user or operator looks in the direction of the exterior mirror, and/or to engage/toggle the adjusting apparatus to adjust an interior mirror by an operator control action by the user or operator on the operator control device, provided that, and so long as, the sensing device recognizes that the user or operator looks in the direction of the interior mirror.

According to yet a further advantageous development of the system, the adjusting apparatus may have at least one joystick or rotary switch as an operator control device.

The method for automatically engaging/toggling an adjusting apparatus for adjusting a horizontal and/or vertical position of a viewing window of a head-up display device of a vehicle, uses the system described herein, or one of the advantageous developments thereof.

The method includes:

sensing and evaluating the line of vision of a user or operator of the head-up display device using the sensing device; and engaging/toggling the adjusting apparatus to adjust the horizontal and/or vertical position of the viewing window of the head-up display device of the vehicle, provided that, and so long as, the sensing device recognizes that the user or operator looks in the direction of the projection area, by the control device.

According to a first advantageous development of the method, the method further engaging/toggling the adjusting apparatus to adjust an exterior mirror, provided that, and so long as, the sensing device recognizes that the user or operator looks in the direction of the exterior mirror, by the control device, and/or engaging/toggling the adjusting apparatus to adjust an interior mirror, provided that, and so long as, the sensing device recognizes that the user or operator looks in the direction of the interior mirror, by the control device.

Also described herein is a vehicle having the system described above or one of the developments thereof.

According to an advantageous development of the vehicle, the operator control device of the adjusting apparatus is arranged in the region of the driver's door, the steering wheel handle, the dashboard, the center console or between the driver's and front passenger's seats.

BRIEF DESCRIPTION OF THE DRAWINGS

These and other aspects and advantages will become more apparent and more readily appreciated from the following description of the exemplary embodiments, taken in conjunction with the appended drawing in which.

DETAILED DESCRIPTION OF THE PREFERRED EMBODIMENT

Figure 1:
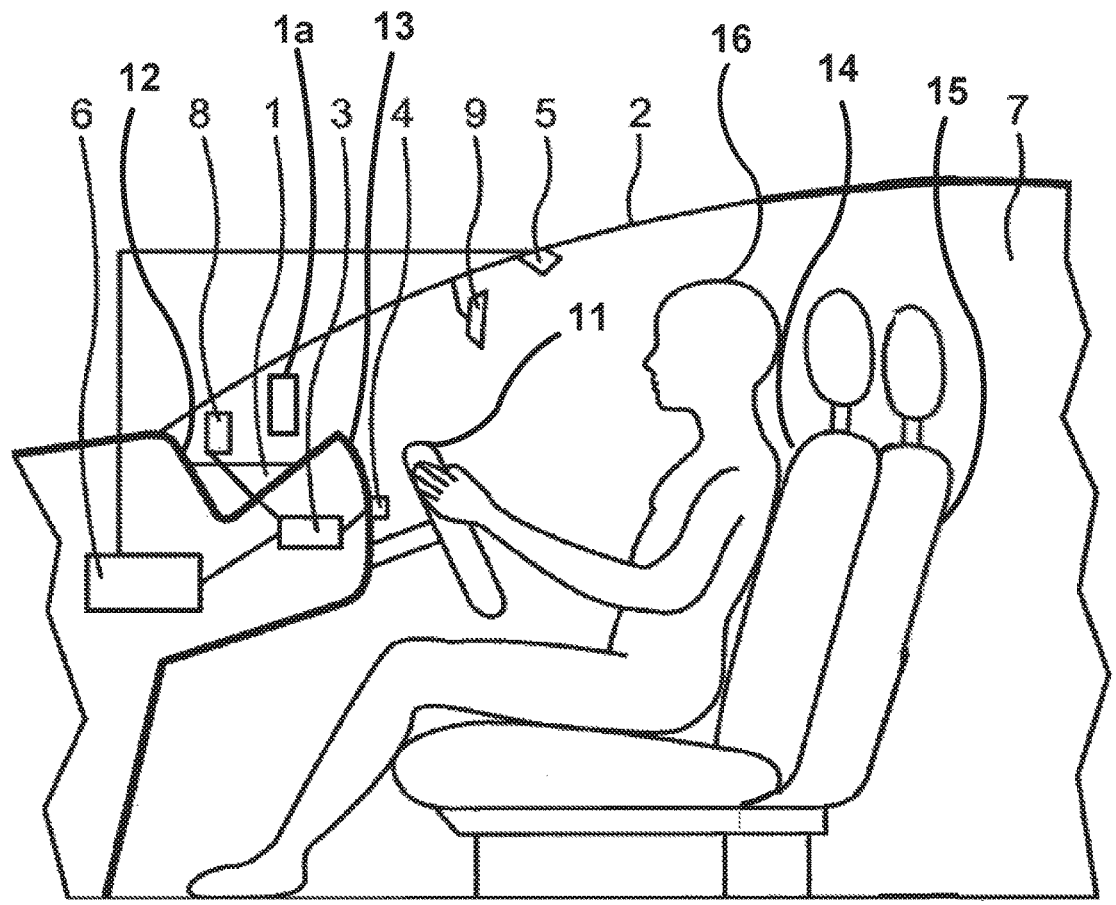
FIG. 1 schematically depicts an example of a system in which the representations are purely schematic and not to scale.
Figure 2:
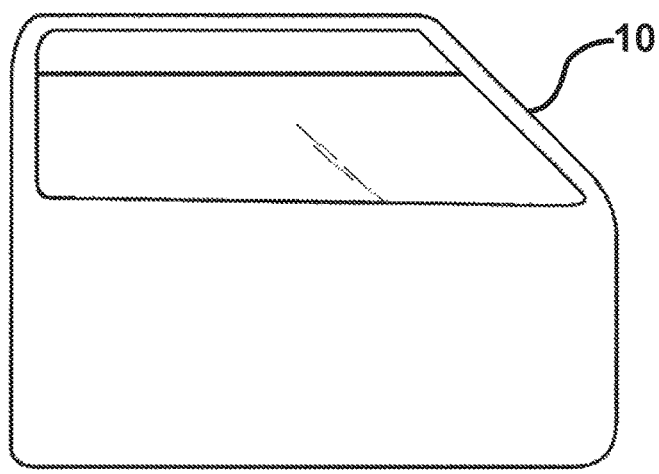
FIG. 2 is an interior side view of a driver door.

Reference will now be made in detail to the preferred embodiments, examples of which are illustrated in the accompanying drawings, wherein like reference numerals refer to like elements throughout.

The exemplary embodiments explained below are not limiting examples of the invention.

As schematically shown in FIG. 1, the system for automatically engaging/toggling an adjusting apparatus for adjusting a horizontal and/or vertical position of a viewing window of a head-up display device of a vehicle includes a head-up display device 1, which is set up to be able to project a display onto a projection area 2 of a vehicle, and an adjusting apparatus 3, coupled to the head-up display device 1, having an operator control device 4 that is set up to be able to adjust at least the horizontal and/or vertical position of the viewing window 1a of the head-up display device 1 by a control action of the operator on the operator control device 4.

The system may include a sensing device 5 for sensing and evaluating a line of vision of a user or operator of the head-up display device 1, and a control device 6 that is coupled to the adjusting apparatus 3 and the sensing device 5, wherein the control device 6 is set up to engage/toggle the adjusting apparatus 3 to adjust the horizontal and/or vertical viewing window of the head-up display device 1 of the vehicle 7, provided that, and so long as, the sensing device 5 recognizes that the user or operator looks in the direction of the projection area 2.

In the case of head-up display devices 1, light from a light source, for example a light emitting diode, is known to be directed onto an image producing device, such as a liquid crystal display, by a light-directing optical system, and the image produced in this manner is projected by a depiction device onto a specular, translucent projection area 2 of the vehicle, which may also be in the form of a "combiner".

In the projection area 2, the light from the head-up display device 1 is reflected into the eyes of the user or operator, i.e. the driver. Since the projection area 2 is normally positioned in front of the user (operator or driver) in a vehicle 7 (windshield) and extends partially via his range of vision into the surrounding region of the vehicle 7, a driver can simultaneously view the surrounding region of the vehicle 7 and information provided by the head-up display device 1. This does not require a driver to change the focus of his eyes, since the image from the head-up display device 1 is projected into infinity.

Head-up display devices 1 can fundamentally be used to display all possible information (in the form of virtual images), for example an operating state of the vehicle 7, the vehicle speed, navigation instructions, warnings, etc. Modern head-up display devices 1 are capable of inserting information into the field of vision of the user or operator in a situationally correct, i.e. positionally correct and perspectively correct, manner.

As already mentioned above, particularly owing to the installation space available for the head-up display device 1 in (motor) vehicles, the viewing window ("eye box" or "head box") within which the information displayed by the head-up display device 1 is visible to the user or operator is relatively small, which means that it is desirable or even necessary to be able to adjust the viewing window of the head-up display device 1 in the horizontal and vertical directions for different users or operators.

One of the inherently known solutions therefor has provision for an adjusting apparatus having an operator control device to be provided, wherein operator control actions on the operator control device can adjust the viewing window of the head-up display device. Before an adjustment to the viewing window of the head-up display device is made, however, it is often necessary for the user or operator to transfer the adjusting apparatus from an off state (for example neutral position of the operator control device) to an engaged state by a first operator control action on the operator control device. This disadvantage is overcome by the system described herein.

The system has a sensing device 5 for sensing and evaluating a line of vision of the user or operator of the head-up display device 1. Such sensing devices 5 are known from the related art.

For use in (motor) vehicles, external systems that allow contactless measurements to be performed are advantageous as a rule. These systems fundamentally always involve the use of at least one camera device that is used to recognize an eye within a face and to track the movement of the eye.

Various techniques are known that can be used for devices for sensing and evaluating a line of vision of the user or operator. In the case of "pan/tilt" systems, mechanically mobile components track the camera with the camera optical system to the head movements of a user. In the case of "tilting mirror" systems, the camera and the optical system are installed in a spatially fixed manner and servo-driven mirrors allow the eye to be tracked in the case of head movements. In the case of "fixed camera" systems, mechanically mobile components are dispensed with and the images captured by the camera device(s) are evaluated by image processing.

Since the sensing device 5 for sensing and evaluating a line of vision of the user or operator is installed in a locally fixed manner on a known location within the (motor) vehicle 7, it is possible to use the position of at least one eye of the user (operator or driver) and the ascertained line of vision to establish, at least with the required accuracy, the point in the interior of the vehicle at which the user (operator or driver) is currently looking.

The position and size of the projection area 2 within which the (virtual) image from the head-up display device 1 can be projected is likewise firmly prescribed in a (motor) vehicle 7.

The line of vision of the user (operator or driver), which can be ascertained repeatedly at suitable intervals of time (for example 1×/s, 2×/s, 3×/s, 4×/s, 5×/s, 8×/s, 10×/s, 15×/s, 20×/s, 25×/s, 30×/s; ×=times, s=second), and the known position and size of the projection area 2 can therefore be used in a simple manner (e.g. using the angles between the sensing axis of the sensing device 5 and the line of vision of the user or operator) to establish whether or not the user (operator or driver) looks in the direction of the projection area 2.

When and so long as the driver looks in the direction of the projection area 2, the control device 6 is used to engage or toggle the adjusting apparatus 3 to adjust the horizontal and/or vertical viewing window of the head-up display device 1 of the vehicle 7. The data required therefor are received by the control device 6 from the sensing device 5, or are requested by the control device 6 from the sensing device 5 (at suitable intervals of time).

The control device 6 may be any that can be used to engage, toggle and possibly even disengage the adjusting apparatus 3. By way of example, the control device 6 may be a part of a digital computation device that is today already present in many modern (motor) vehicles, or else an assembly or subassembly that is separate therefrom. The control device 6 may be set up to communicate with the adjusting apparatus 3 and the sensing device 5 by wire or wirelessly. By way of example, the control device 6, the adjusting apparatus 3 and the sensing device 5 may be coupled to a vehicle-based bus system (for example CAN bus), or can communicate via a vehicle-based bus system.

The adjusting apparatus 3 may be any suitable apparatus that can be used to adjust the horizontal and/or vertical position of the viewing window of the head-up display device 1, for example may be an adjusting apparatus 3 having electric-motor-driven threaded rods, gearwheels, gear racks and/or (stepping) motors that can be used to adjust the orientation of the head-up display device 1 or the direction of projection of the depiction device onto the specular, translucent projection area 2 relative to the vehicle 7 at least along two directional axes.

In the case of the system described herein, the control device 6 is set up to engage/toggle the adjusting apparatus 3 to adjust the horizontal and/or vertical viewing window of the head-up display device 1 of the vehicle 7, provided that, and so long as, the sensing device 5 recognizes that the user or operator looks in the direction of the projection area 2.

Hence, a user (operator or driver) of a (motor) vehicle can make an adjustment to the viewing window of the head-up display device 1 by an operator control action on the operator control device 4 without first needing to transfer the operator control device from an off state (for example neutral position of the operator control device) to an engaged state. Instead, it is sufficient for him to look in the direction of the projection area 2 when he performs the operator control action on the operator control device 4.

If, as provided for in accordance with the first advantageous development of the system, the adjusting apparatus 3 having the operator control device 4 is further set up at least to adjust at least one exterior mirror 8 and/or an interior mirror 9 of the vehicle, then the adjusting apparatus 3 is engaged or toggled by the control device 6 automatically for the purpose of adjusting the horizontal and/or vertical position of the viewing window of the head-up display device 1 by an operator control action on the operator control device, provided that, and so long as, the sensing device 5 recognizes that the user or operator looks in the direction of the projection area 2.

In this advantageous development, the advantage therefore arises that firstly the number of operator control elements for different vehicle-based devices can be reduced, but at the same time the advantages of the system are retained.

Further advantages arise if, as provided for in accordance with a further advantageous development of the system, the control device 6 is further set up to engage/toggle the adjusting apparatus 3 to adjust an exterior mirror 8 by an operator control action by the user or operator on the operator control device 4, provided that, and so long as, the sensing device 5 recognizes that the user or operator looks in the direction of the exterior mirror 8, and/or to engage/toggle the adjusting apparatus 3 to adjust an interior mirror 9 by an operator control action by the user or operator on the operator control device 4, provided that, and so long as, the sensing device 5 recognizes that the user or operator looks in the direction of the interior mirror 9.

In this case, the functionality of the adjusting apparatus for adjusting the head-up display device 1 is combined with a functionality for adjusting at least one further vehicle-based device, such as for adjusting an exterior mirror 8 and/or the interior mirror 9, for example.

Solely as a result of the sensing and evaluation of the line of vision of the user or operator is the adjusting apparatus 3 "activated", i.e. engaged or toggled, for an adjustment on that vehicle-based device at which a user or operator is currently looking. Hence, an adjustment is possible even with multiple different vehicle-based devices using just one operator control device 4 without the user or operator having to perform any mechanical toggling (function selection) for this or a separate operator control device.

The adjusting apparatus 3 can include any suitable devices as operator control device 4. The adjusting apparatus 3 may be at least one joystick or rotary switch as operator control device 4. Such devices are known per se from the related art.

By way of example, movement of a joystick to the left or right can be used to adjust the horizontal position of the viewing window of the head-up display device 1, and movement of the joystick upward or downward or forward or backward can be used to adjust the vertical position of the viewing window of the head-up display device 1. The orientation of the mirror elements of exterior mirror(s) 8 and interior mirror 9 can be adjusted in a corresponding manner.

In the case of a rotary switch, there may be provision for sliding or tilting of the operator control plane along a first directional axis to be able to move the viewing window of the head-up display device upward or downward, and for sliding or tilting of the operator control plane along a second directional axis, which is oriented perpendicular to the first directional axis, to be able to move the viewing window of the head-up display device to the left or right.

Rotation of the rotary switch can further provide for this to be able to select one or more other vehicle-based devices, for example mirror heating, folding-in of the exterior mirrors, etc.

The method includes automatically engaging/toggling an adjusting apparatus 3 for adjusting a horizontal and/or vertical position of a viewing window of a head-up display device 1 of a vehicle 7.

The method specifically includes:

sensing and evaluating the line of vision of a user or operator of the head-up display device 1 using the sensing device 5; and engaging/toggling the adjusting apparatus 3 to adjust the horizontal and/or vertical position of the viewing window of the head-up display device 1 of the vehicle 7, provided that, and so long as, the sensing device 5 recognizes that the user or operator looks in the direction of the projection area 2, by the control device 6.

Advantageously, the method may be developed such that it further includes:

engaging/toggling the adjusting apparatus 3 to adjust an exterior mirror 8, provided that, and so long as, the sensing device 5 recognizes that the user or operator looks in the direction of the exterior mirror 8, by the control device 6, and/or engaging/toggling the adjusting apparatus 3 to adjust an interior mirror 9, provided that, and so long as, the sensing device 5 recognizes that the user or operator looks in the direction of the interior mirror 9, by the control device 6.

A vehicle 7 having a system as described above may advantageously be developed such that the operator control device 4 of the adjusting apparatus 3 is arranged in the region of the driver's door 10, the steering wheel 11, the dashboard 12, the center console 13 or between the driver's and front passenger's seats 14 and 15, respectively.

Provided that the present application uses the expression "so long as" (the sensing device 5 recognizes that the user or operator looks in a particular direction), this also covers a short period of 0.2 s, 0.5 s, 1 s, 1.5 s, 2 s (s=second), for example, during which the user or operator no longer looks in the particular direction, for example because he has been briefly distracted by an event or looks at the operator control device 4. Even during this short period, the adjusting apparatus 3 can continue to remain engaged for adjusting the vehicle-based device in whose direction the user or operator 16 has previously looked. As a result, the process of adjusting the vehicle-based device is not interrupted for an operator control action on the operator control device 4 by the user or operator 16, or the user or operator 16 can begin an adjustment for the vehicle-based device by an operator control action on the operator control device 4 even if the user or operator 16 briefly does not look in the direction of the relevant vehicle-based device.

When the viewing window of the head-up display device 1 is adjusted by adjustment of the (virtual) image from the head-up display device 1 in the vertical direction on the projection area 2, there may likewise be provision for a prescribed, automatic rotation of the image producing device to be prompted on the basis of the adjustment of the depiction device. This makes it possible to compensate for tolerances when the head-up display is installed, tolerances when the windshield is installed and/or curvatures in the windshield that cause a depiction for presentation to be "distorted" (for example to "hang down") when the image produced is adjusted for height.

Since a person skilled in the art knows the components (assemblies, subassemblies, elements, hardware and software components, etc.) that are possible for the system and also the developments, embodiments and exemplary embodiments thereof, and also the possible interaction of the components, these do not need to be discussed in more detail herein the present application.

The adjustment of a head-up display device 1 uses an operator control device 4 of an adjusting device 3 without mechanical toggling (function selection). The user (operator or driver) can adjust the head-up display device 1 by looking at the projection area 2 of the head-up display device 1 and operating the operator control device 4, which is automatically engaged/toggled by the control device 6 to adjust the viewing window of the head-up display device 1 if, and so long as, the sensing device 5 for sensing and evaluating a line of vision of the user or operator 16 recognizes that the user or operator 16 looks in the direction of the projection area 2.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v *DIRECTV*, 358 F3d 870, 69 USPQ2d 1865 (Fed. Cir. 2004).

The invention claimed is:

1. A system for automatically engaging/toggling an adjusting apparatus between adjusting a horizontal and/or vertical position of a viewing window of a head-up display device of a vehicle and adjusting one of an interior mirror and an exterior mirror of the vehicle, comprising:

the head-up display device able to project a display onto a projection area of the vehicle;

the adjusting apparatus, coupled to the head-up display device, having an operator control device, able to adjust the horizontal and/or vertical position of the viewing window of the head-up display device in response to a control action of an operator on the operator control device, and to adjust at least one of the exterior mirror and the interior mirror;

a sensing device sensing and evaluating a line of vision of the operator of the head-up display device; and a control device, coupled to the adjusting apparatus and the sensing device, engaging/toggling the adjusting apparatus to adjust the horizontal and/or vertical position of the viewing window of the head-up display device of the vehicle, provided that, and so long as, the sensing device recognizes that the operator looks in the direction of the projection area, and at least one of:

engaging/toggling the adjusting apparatus to adjust the exterior mirror by the control action of the operator on the operator control device, provided that, and so long as, the sensing device recognizes that the operator looks in the direction of the exterior mirror; and engaging/toggling the adjusting apparatus to adjust the interior mirror by the control action of the operator on the operator control device, provided that, and so long as, the sensing device recognizes that the operator looks in the direction of the interior mirror.

2. The system as claimed in claim 1, wherein the adjusting apparatus comprises at least one of a joystick and a rotary switch as the operator control device.

3. A method for automatically engaging/toggling an adjusting apparatus for adjusting a horizontal and/or vertical position of a viewing window of a head-up display device of a vehicle, comprising:

sensing and evaluating a line of vision of an operator of the head-up display device using a sensing device;

engaging/toggling the adjusting apparatus to adjust the horizontal and/or vertical position of the viewing window of the head-up display device of the vehicle, provided that, and so long as, the sensing device recognizes that the operator looks in the direction of a projection area of the head-up display device, by a control device, and at least one of:

engaging/toggling the adjusting apparatus to adjust an exterior mirror, provided that, and so long as, the sensing device recognizes that the operator looks in the direction of the exterior mirror, by the control device, and engaging/toggling the adjusting apparatus to adjust an interior mirror, provided that, and so long as, the sensing device recognizes that the operator looks in the direction of the interior mirror, by the control device.

4. A vehicle, comprising:

at least one of an interior mirror and an exterior mirror;

a head-up display device able to project a display onto a projection area of the vehicle;

an adjusting apparatus, coupled to the head-up display device, having an operator control device, able to adjust at least one of horizontal and vertical positions of a viewing window of the head-up display device in response to a control action of an operator on the operator control device, and to adjust the at least one of the exterior mirror and the interior mirror;

a sensing device sensing and evaluating a line of vision of the operator of the head-up display device; and a control device, coupled to the adjusting apparatus and the sensing device, engaging/toggling the adjusting apparatus to adjust the at least one of the horizontal and vertical positions of the viewing window of the head-up display device, provided that, and so long as, the sensing device recognizes that the operator looks in the direction of the projection area, and at least one of:

engaging/toggling the adjusting apparatus to adjust the exterior mirror by the control action of the operator on the operator control device, provided that, and so long as, the sensing device recognizes that the operator looks in the direction of the exterior mirror; and engaging/toggling the adjusting apparatus to adjust the interior mirror by the control action of the operator on the operator control device, provided that, and so long as, the sensing device recognizes that the operator looks in the direction of the interior mirror.

5. The vehicle as claimed in claim 4, wherein the adjusting apparatus comprises at least one of a joystick and a rotary switch as the operator control device.

6. The vehicle as claimed in claim 4, further comprising a driver door, a steering wheel, a dashboard, a center console, a driver seat and a front passenger seat, wherein the operator control device of the adjusting apparatus is arranged one of on the driver door, on the steering wheel, on the dashboard, on the center console and between the driver seat and the front passenger seat.

* * * * *